(12) United States Patent
Lauder

(10) Patent No.: US 10,926,873 B2
(45) Date of Patent: Feb. 23, 2021

(54) ELECTRIC POWERED DIRECT DRIVE ROTOR MOTOR WITH INTEGRATED MECHANICAL FLIGHT CONTROL

(71) Applicant: Lockheed Martin Corporation, Bethesda, MD (US)

(72) Inventor: Timothy F. Lauder, Oxford, CT (US)

(73) Assignee: Lockheed Martin Corporation, Bethesda, MD (US)

(*) Notice: Subject to any disclaimer, the term of this patent is extended or adjusted under 35 U.S.C. 154(b) by 217 days.

(21) Appl. No.: 16/013,762

(22) Filed: Jun. 20, 2018

(65) Prior Publication Data
US 2019/0389570 A1    Dec. 26, 2019

(51) Int. Cl.
| | |
|---|---|
| *B64C 27/605* | (2006.01) |
| *B64C 27/68* | (2006.01) |
| *B64D 27/24* | (2006.01) |
| *B64C 27/72* | (2006.01) |

(52) U.S. Cl.
CPC ............ *B64C 27/605* (2013.01); *B64C 27/68* (2013.01); *B64C 27/72* (2013.01); *B64D 27/24* (2013.01); *B64C 2027/7255* (2013.01)

(58) Field of Classification Search
CPC ......... B64C 11/30; B64C 11/44; B64C 27/12; B64C 27/24; B64C 27/32; B64C 27/37; B64C 27/605; B64C 27/68; B64C 27/72; B64C 2027/7255; B64C 2201/042
See application file for complete search history.

(56) References Cited

U.S. PATENT DOCUMENTS

| | | | |
|---|---|---|---|
| 3,830,588 A * | 8/1974 | Nagler | B64C 27/325 |
| | | | 416/20 R |
| 7,988,089 B2 * | 8/2011 | Wittmer | B64C 27/68 |
| | | | 244/17.13 |
| 8,840,372 B2 * | 9/2014 | Girard | B64C 27/605 |
| | | | 416/114 |
| 9,004,395 B2 | 4/2015 | Botti | |
| 2019/0023384 A1 * | 1/2019 | Lauder | H02K 21/24 |

* cited by examiner

*Primary Examiner* — David E Sosnowski
*Assistant Examiner* — Danielle M. Christensen
(74) *Attorney, Agent, or Firm* — Baker Botts L.L.P.

(57) ABSTRACT

An electric propulsion system including a stationary rotor hub assembly and a rotating system mounted to the stationary rotor hub assembly. The rotating system is rotatable about an axis. An electric motor including a stator assembly is associated with the rotor hub assembly and a rotor assembly of the electric motor is associated with the rotating system. A swashplate assembly having a dynamic component is integrated into the rotor hub assembly.

20 Claims, 13 Drawing Sheets

ELECTRIC POWERED DIRECT DRIVE ROTOR MOTOR WITH INTEGRATED MECHANICAL FLIGHT CONTROL

BACKGROUND

The present disclosure relates to a rotary wing aircraft, and more particularly, to a swashplate assembly for controlling the pitch of the main rotor blades of a rotary wing aircraft main rotor system.

Control of a rotary wing aircraft, such as a helicopter, is affected by varying the pitch of the rotor blades individually and by varying the pitch of the blades together, as the rotor rotates about an axis. These are known respectively as cycle and collective pitch control. Blade pitch control of a rotary wing aircraft is typically achieved through a swashplate assembly which transfers the motion of non-rotating control members to rotating members.

In existing systems, the shaft of a main rotor system of a rotary wing aircraft is configured to rotate about an axis of rotation. A rotor hub is coupled to the shaft, such that the shaft drives rotation of the rotor hub and the rotor blades mounted thereto about the axis. With advances in motor technology, newer rotor systems have been developed that integrate an electric motor into the rotor hub to drive the rotor head and rotor blades about the axis of rotation. In such systems, the shaft on which the rotor hub is supported no longer rotates about an axis. Due to this change in the rotating and non-rotating frames of the rotor assembly, there is a need to adapt existing mechanical flight control technology, and specifically a swashplate assembly, for use with rotors having an electric drive integrated therein.

BRIEF DESCRIPTION

According to an embodiment, an electric propulsion system including a stationary rotor hub assembly and a rotating system mounted to the stationary rotor hub assembly. The rotating system is rotatable about an axis. An electric motor including a stator assembly is associated with the rotor hub assembly and a rotor assembly of the electric motor is associated with the rotating system. A swashplate assembly having a dynamic component is integrated into the rotor hub assembly.

In addition to one or more of the features described above, or as an alternative, in further embodiments the dynamic component of the swashplate assembly is at least one flight control actuator.

In addition to one or more of the features described above, or as an alternative, in further embodiments comprising a swashplate guide defining the axis and the swashplate assembly.

In addition to one or more of the features described above, or as an alternative, in further embodiments the swashplate guide is integrally formed with the stationary rotor hub assembly.

In addition to one or more of the features described above, or as an alternative, in further embodiments the swashplate assembly further comprises: a stationary swashplate rotationally fixed relative to the axis and a rotating swashplate rotatable relative to the stationary swashplate about the axis.

In addition to one or more of the features described above, or as an alternative, in further embodiments the stationary swashplate and the rotating swashplate are vertically stacked about the axis.

In addition to one or more of the features described above, or as an alternative, in further embodiments a diameter of the stationary swashplate is less than a diameter of the rotating swashplate.

In addition to one or more of the features described above, or as an alternative, in further embodiments the swashplate assembly further comprises a uniball disposed configured to mount the stationary swashplate and the rotating swashplate about the swashplate guide.

In addition to one or more of the features described above, or as an alternative, in further embodiments the stationary swashplate and the rotating swashplate maintain a constant alignment with the stationary rotor hub assembly.

In addition to one or more of the features described above, or as an alternative, in further embodiments the swashplate assembly further comprises a flight control actuator connected at a first end to the stationary rotor hub assembly and connected at a second end to the stationary swashplate, the flight control actuator being generally positioned within the stationary rotor hub assembly.

In addition to one or more of the features described above, or as an alternative, in further embodiments the flight control actuator is operable to translate the stationary swashplate and the rotating swashplate along the axis to impart collective pitch control.

In addition to one or more of the features described above, or as an alternative, in further embodiments flight control actuator is operable to tilt the stationary swashplate and the rotating swashplate along the axis to impart cyclic pitch control.

In addition to one or more of the features described above, or as an alternative, in further embodiments power for operating the flight control actuator is provided via wiring extending through at least one of the static mast and the stationary rotor hub assembly.

In addition to one or more of the features described above, or as an alternative, in further embodiments the swashplate assembly further comprises a pitch control rod connected at a first end to a rotor blade assembly and connected at a second end to the rotating swashplate.

In addition to one or more of the features described above, or as an alternative, in further embodiments the swashplate assembly further comprises a stationary scissors assembly extending between the stationary swashplate and the stationary rotor hub assembly and a rotating scissors assembly extending between the rotating swashplate and the rotating system.

According to another embodiment, a rotary wing aircraft includes an airframe and a rotor system including a static mast engaged with the airframe and extending along an axis, a stationary rotor hub assembly, a rotating system coupled to the rotor hub assembly, an electric motor housed within the rotor system, a plurality of rotor blades projecting radially outward from the rotor system, and a swashplate assembly at least partially integrated into the stationary rotor hub assembly. The electric motor includes a stator assembly coupled to the stationary rotor hub assembly and a rotor assembly coupled to the rotating system.

In addition to one or more of the features described above, or as an alternative, in further embodiments the rotor system further comprises a power generation system operable to generate power as the rotating system rotates about an axis.

In addition to one or more of the features described above, or as an alternative, in further embodiments the swashplate assembly further comprises a flight control actuator, the flight control actuator being positioned within the stationary rotor hub assembly.

In addition to one or more of the features described above, or as an alternative, in further embodiments the swashplate assembly further comprises a swashplate guide mounted concentrically with the rotor head.

In addition to one or more of the features described above, or as an alternative, in further embodiments the swashplate guide is integrally formed with the stationary rotor hub assembly.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
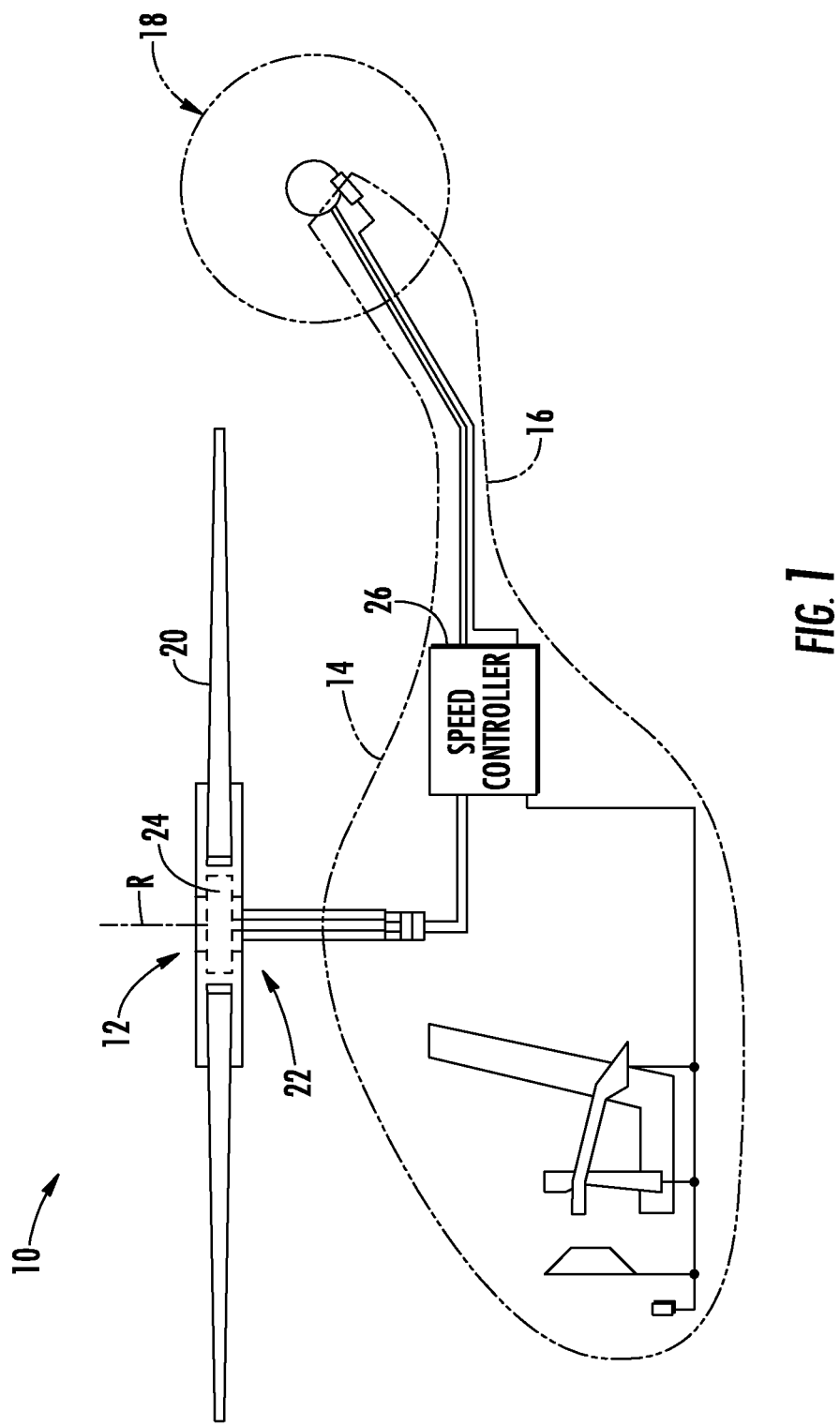
FIG. 1 is a schematic diagram of an example of a vertical takeoff and landing (VTOL) rotary wing aircraft.
Figure 2:
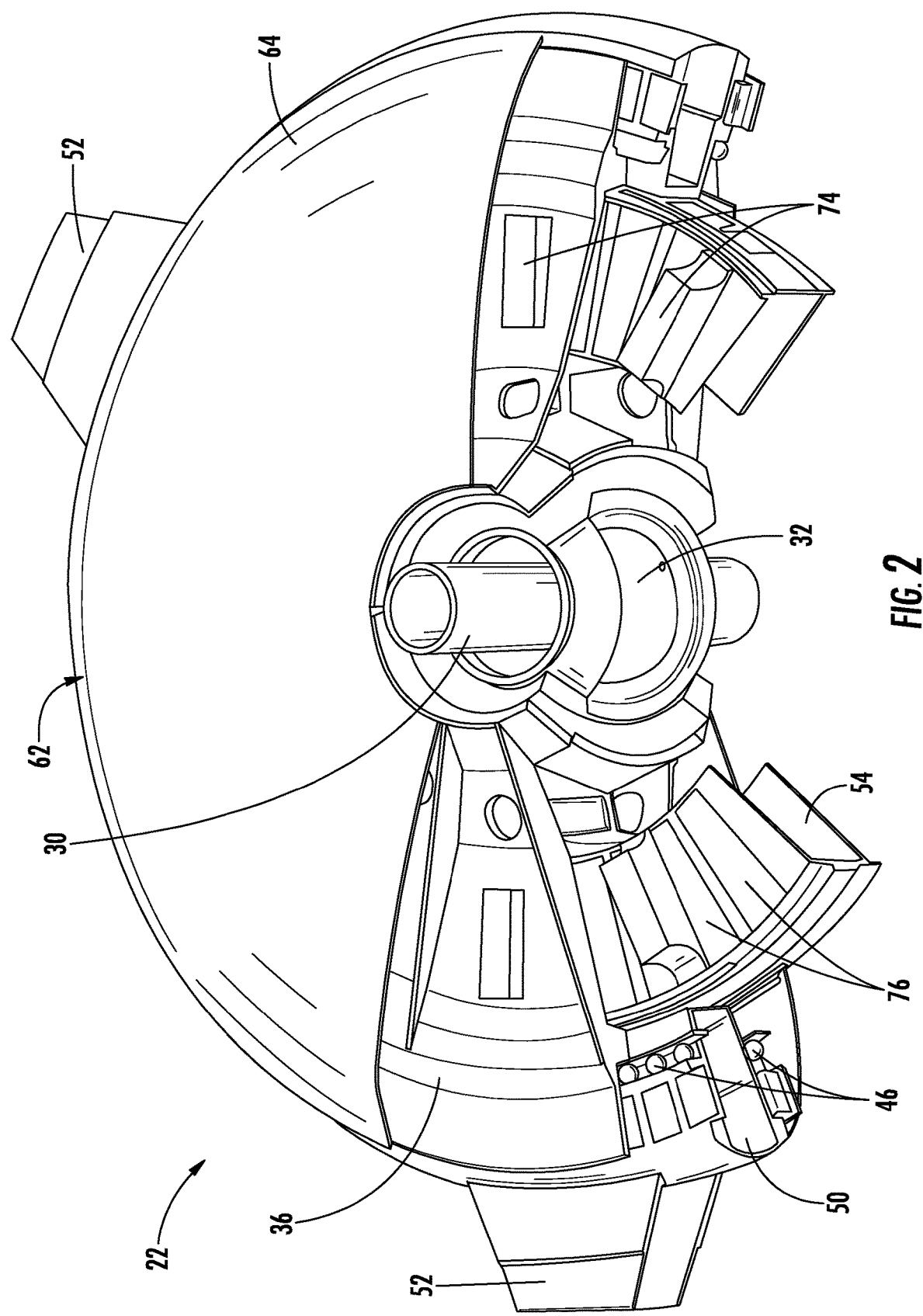
FIG. 2 is a perspective view of a propulsion system according to an embodiment.
Figure 3:
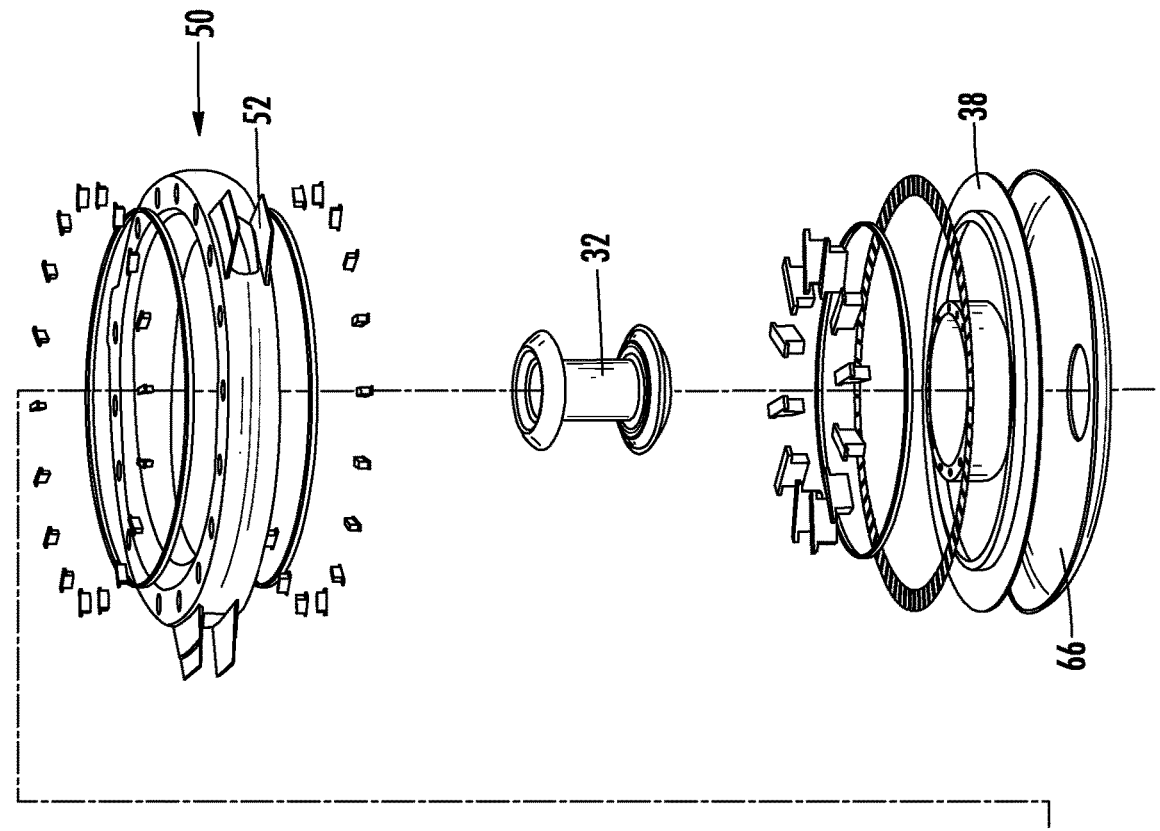
FIG. 3 is an exploded view of the propulsion system of FIG. 2 according to an embodiment.
Figure 3:
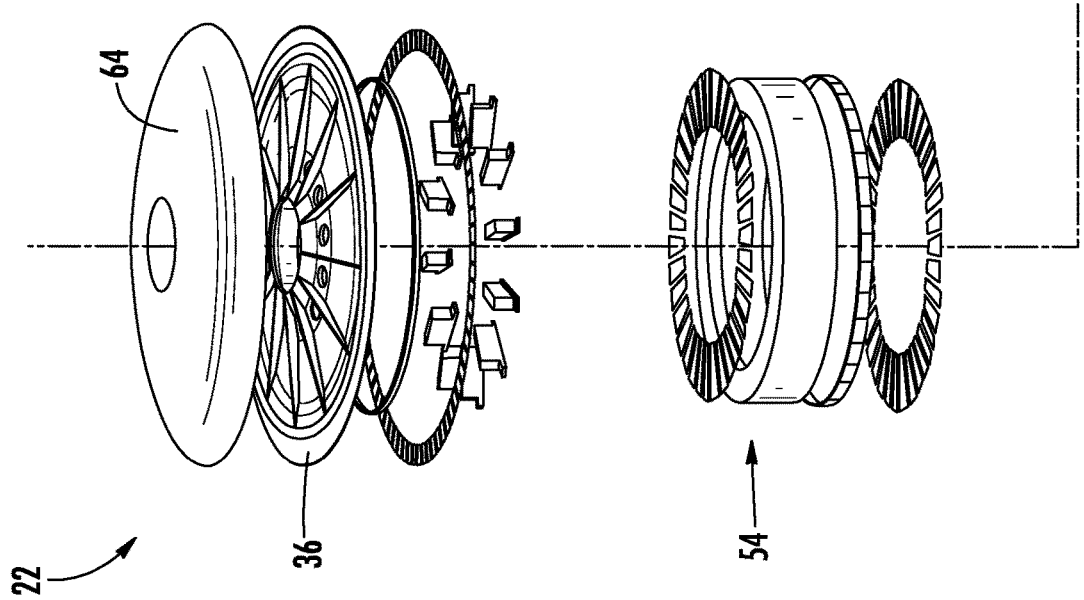
Figure 4:
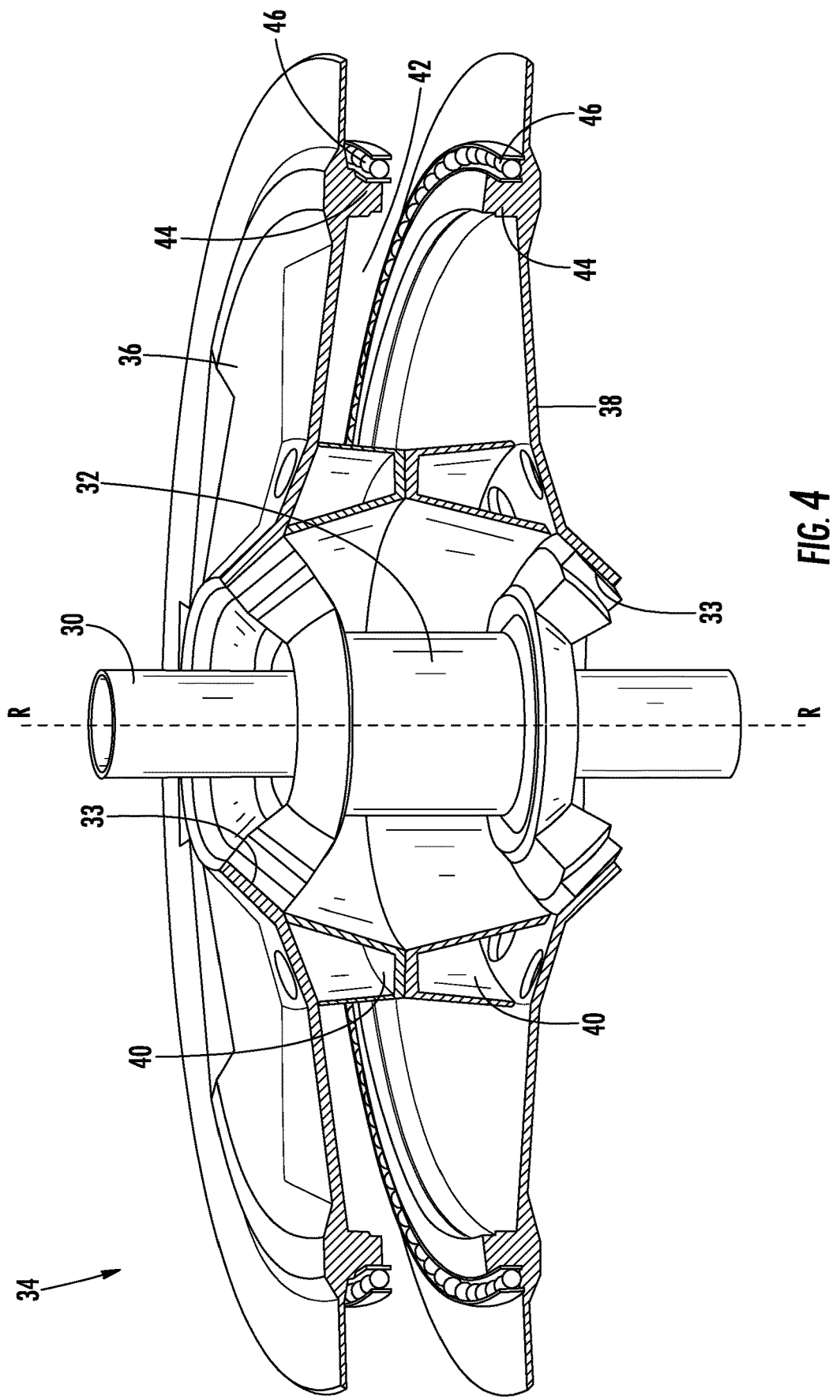
FIG. 4 is a perspective, partially cut away view of a stationary rotor hub assembly of the propulsion system according to an embodiment.

FIG. 1 schematically illustrates an example of a vertical takeoff and landing (VTOL) rotary wing aircraft 10. The aircraft 10 in the non-limiting embodiment of FIG. 1 includes a main rotor system 12 supported by an airframe 14 having an extending tail 16 which mounts an anti-torque system 18, such as a tail rotor system. The main rotor system 12 includes a plurality of rotor blades 20 configured to rotate about an axis of rotation R. Although a particular helicopter configuration is schematically illustrated in the disclosed non-limiting embodiments, other configurations and/or machines, such as Unmanned Air Vehicles, high speed compound rotary wing aircraft with supplemental translational thrust systems, dual counter-rotating, coaxial rotor system aircraft, tilt-rotors and tilt-wing aircraft in either manned or unmanned configurations will also benefit here from.

At least one of the main rotor system 12 and the anti-torque system 18 is configured as an electric propulsion system 22 that generally integrates an electric motor 24 into the rotor of the rotary-wing aircraft 10. The electric motor 24 of the propulsion system 22 may be controlled by an electronic speed controller 26 over a wide range of speeds in response to a flight control system (not shown).

An example of a propulsion system 22 of an aircraft 10, such as a main rotor system 12 of a rotary wing aircraft 10 for example, is illustrated in more detail in FIGS. 2-8. The propulsion system 22 includes a static mast 30 that is generally stationary relative to the airframe 14 of the aircraft 10. The static mast 30 defines, but does not rotate about an axis of rotation R.

An elastomeric gimbal 32 is coupled to the static mast 30, for example between the static mast 30 and a stationary rotor hub assembly 34. The elastomeric gimbal 32 is mounted concentrically with the static mast 30, such as via one or more interlocking splines for example, and is configured to allow the rotor hub assembly 34, to pivot or articulate relative to the static mast 30. The gimbal 32 provides additional degrees of freedom of movement and allows for a semi-rigid in-plane design resulting in reduced flight loads, component size, and vehicle weight. In addition, the gimbal 32 reduces the maintenance and operating costs associated with conventional bearing systems.

Figure 10:
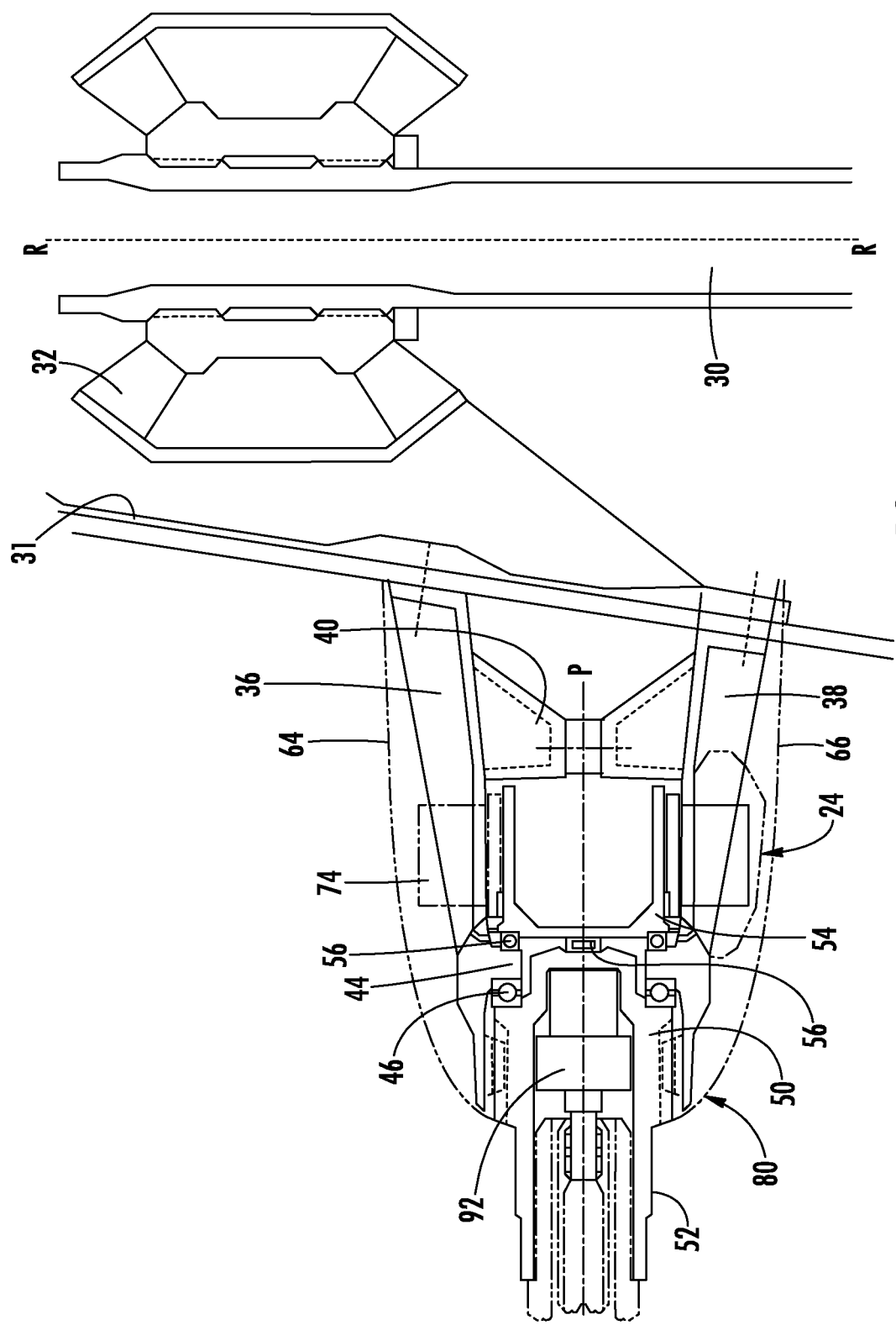
FIG. 10 is a cross-sectional view of the propulsion system according to an embodiment.

In an embodiment, the portion of the rotor hub assembly 34 directly adjacent the static mast 30 is contoured to define at least one bearing interface surface 33 adapted to abut a corresponding surface of the gimbal 32. Alternatively, as shown in FIG. 10, a movable mast 31 may be positioned between the rotor hub assembly 34 and the gimbal 32. In such embodiments, the movable mast 31 does not rotate about the axis of rotation R; however, the movable mast 31 is able to pivot or articulate relative to the static mast 30 and the airframe 14 via the elastomeric bearing 32. One or more actuators (not shown) may be operable to move the mast 31 relative to the static mast 30.

With reference again to FIGS. 2-8, in the illustrated, non-limiting embodiment, the stationary rotor hub assembly 34 includes a first, upper rotor hub 36 and a second, lower rotor hub 38. The second rotor hub 38 is complementary to the first rotor hub 36. In an embodiment, the first rotor hub 36 and the second rotor hub 38 are substantially identical and/or are symmetrical about a plane X. Within the rotor hub assembly 34, the first and second rotor hubs 36, 38 are rotated 180 degrees relative to one another such that the rotor hubs 36, 38 generally face one another.

As shown in the FIGS., each of the first rotor hub 36 and the second rotor hub 38 includes a first rotor hub protrusion 40 extending perpendicularly from an inwardly facing surface of the rotor hub, 36, 38 towards the opposite rotor hub 36, 38. The protrusions 40 are generally sized such the distal end of the protrusion 40 of the first rotor hub 36 directly contacts the end of the protrusion 40 extending from the second rotor hub 38. As a result of this engagement between the first protrusions 40 and the configuration of the rotor hubs 36, 38, a gap or clearance 42 is formed between the first rotor hub 38 and the second rotor hub 38 outboard of the protrusions 40.

A second rotor hub protrusion 44 may extend from an inward facing surface of the rotor hubs 36, 38 at a location between the first protrusion 40 and the outer periphery of the rotor hub assembly 34. The second rotor hub protrusion 44 of each rotor hub 36, 38 may be adapted to support a bearing 46 thereon. In an embodiment, the bearing 46 is a duplex bearing having a race aligned with each of the protrusions 44. As a result, the height of the protrusion 44 may be selected to be generally equal to or slightly larger than a height of the bearing 46.

Figure 5:
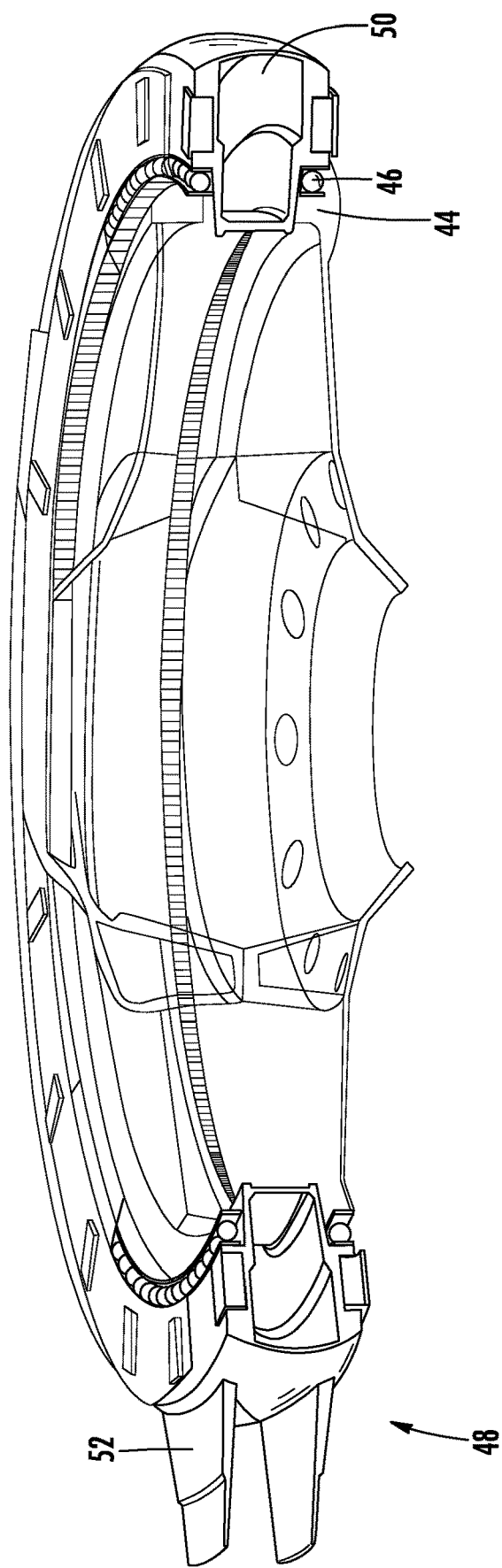
FIG. 5 is a perspective, partially cut away view of a rotating system of the propulsion system according to an embodiment.
Figure 6:
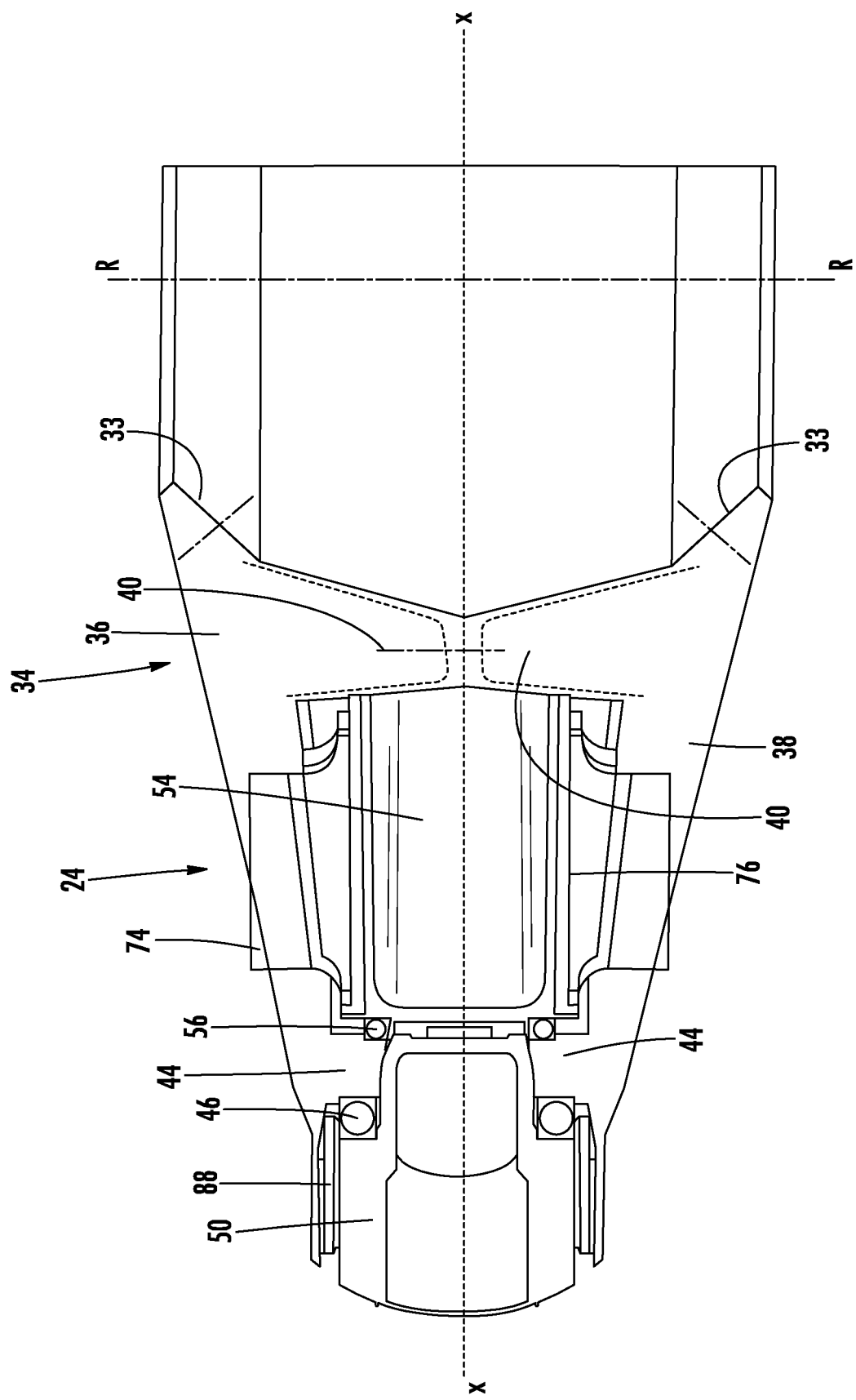
FIG. 6 is a cross-sectional view of a portion of the propulsion system of FIG. 2 according to an embodiment.
Figure 7:
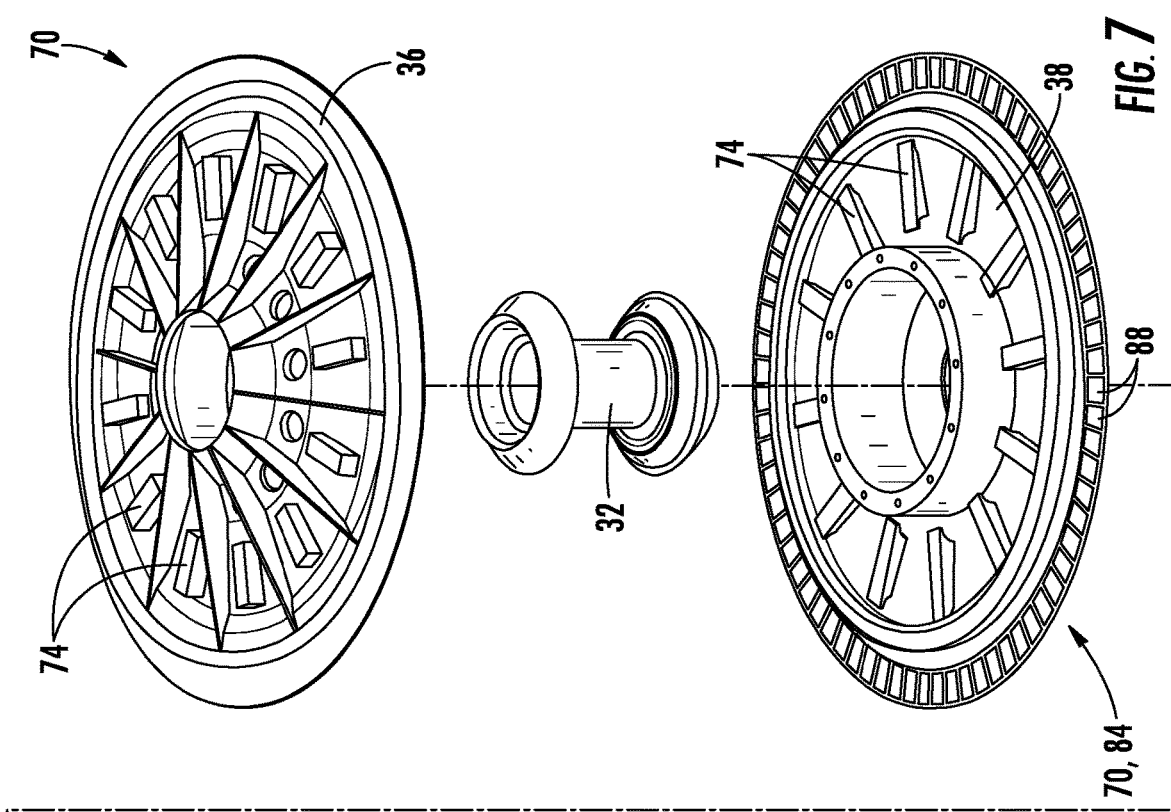
FIG. 7 is a perspective view of various components that define the electric motor of the propulsion system according to an embodiment.
Figure 7:
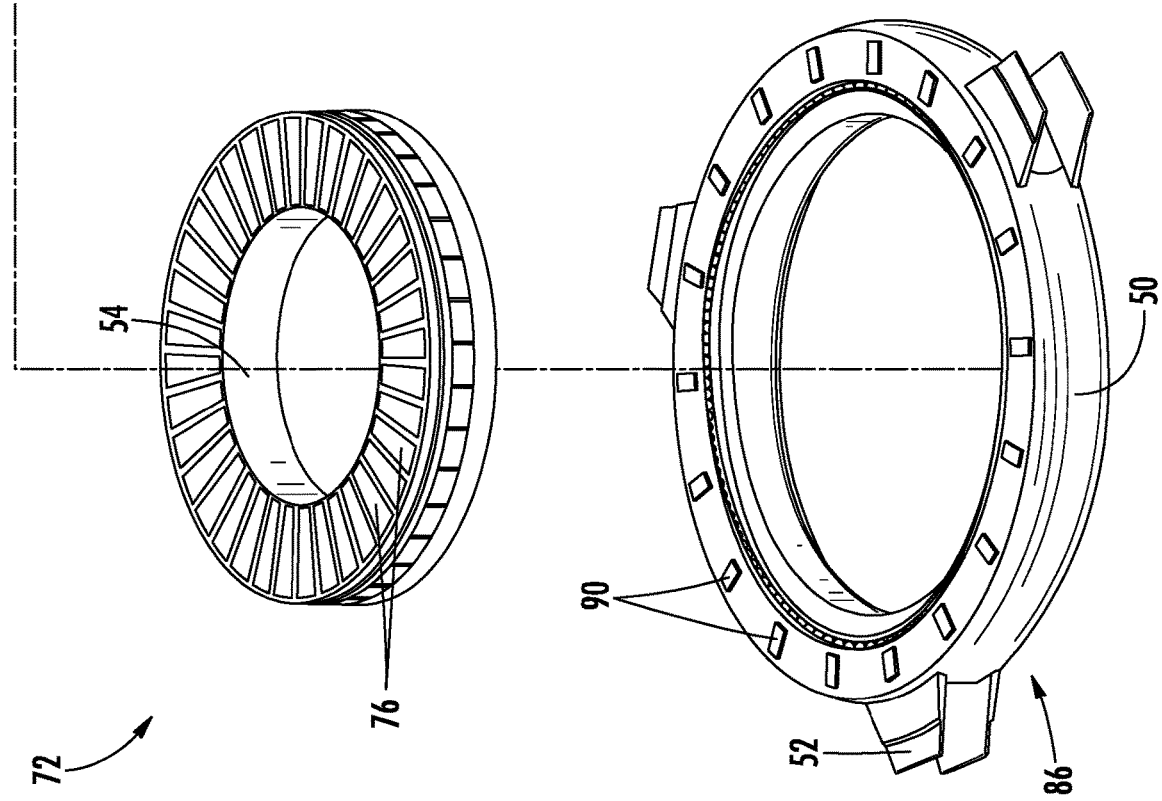
Figure 8:
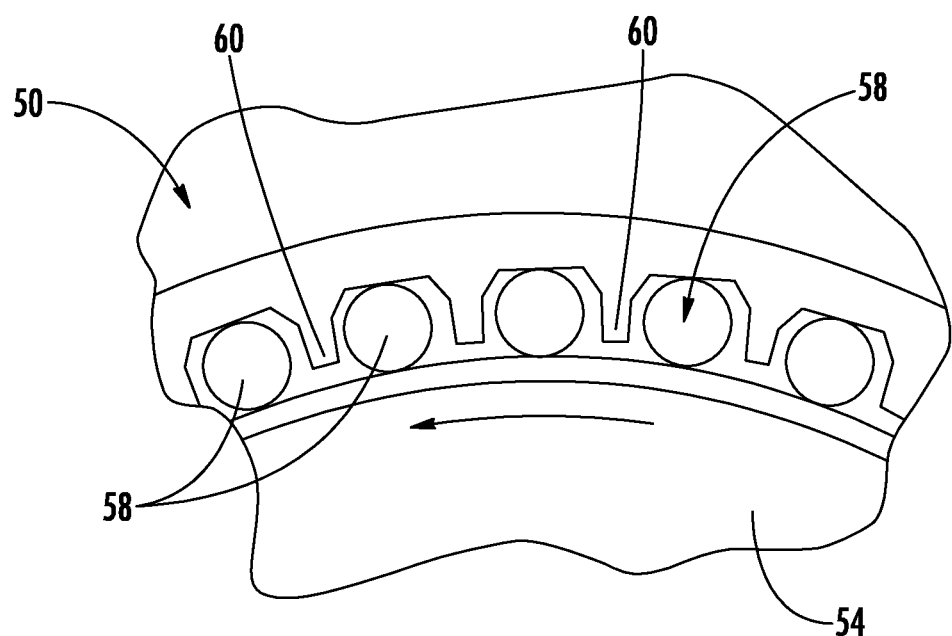
FIG. 8 is a schematic diagram of the interface between the rotor head and the over-running clutch of the rotating system according to an embodiment.

The propulsion system 22 additionally includes a rotating system 48, best shown in FIG. 5, rotatable relative to the stationary rotor hub assembly 34 about the axis R defined by the static mast 30. The rotating system 48 includes a rigid ring-shaped rotor head 50 mounted concentrically with the hub assembly 34. The rotor head 50 is configured to couple an inboard end of each rotor blade 20 to the static mast 30. As shown, a blade attachment cuff 52 configured to couple to a corresponding rotor blade 20 may be integrally formed with and extend generally outwardly from the outer periphery of the rotor head 50. However, embodiments where the rotating system 48 comprises a plurality of individual yokes spaced about the periphery of the static mast 30 and associated with the plurality of rotor blades 20 are also contemplated herein. As shown in the FIGS., the rotor head 50 is positioned generally adjacent the outboard end of the rotor hub assembly 34 between the first rotor hub 36 and the second rotor hub 38. The rotor head 50 is supported within the rotor hub assembly 34 by the at least one bearing 46 at a position adjacent the second protrusions 44.

The rotating system 48 of the propulsion system 22 additionally includes an over-running clutch 54. In an embodiment, the overrunning clutch 54 is generally positioned within the gap 42 between the first protrusions 40 and the second protrusions 44. One or more bearings 56, such as a duplex bearing set arranged adjacent a corresponding surface of the second protrusion 44, support the over-running clutch 54 within the rotor hub assembly 34. In an embodiment, the overrunning clutch 54 is mounted directly adjacent an in-line with a portion of the rotor head 50. As a result, a direct load path for torque transfer exists between the over-running clutch 54 and the rotor head 50. In the illustrated, non-limiting embodiment, best shown in FIG. 8, the overrunning clutch 54 is a roller-ramp overrunning clutch. Accordingly, a plurality of rollers 58 is mounted at an interface between the clutch 54 and the rotor head 50 about the periphery of the clutch 54. In an embodiment, the surface of the rotor head 50 adjacent the clutch 54 includes one or more features 60 configured to cooperate with the clutch 54 to transmit rotation between the clutch 54 and the rotor head 50.

A fairing assembly 62 generally surrounds the exterior of the stationary rotor hub assembly 34 to provide environmentally protect to the propulsion system 22 and to enhance the aerodynamic properties thereof, such as by reducing the drag thereof. The fairing assembly 62 may include a plurality of complementary portions, such as a first, upper fairing 64 and a second, lower fairing 66. In an embodiment, the upper and lower fairings 64, 66 are substantially identical and symmetrical about the plane P extending through the interface of the first protrusions 40 and normal to the axis of rotation R. The outboard ends of the upper and lower fairings 64, 66 are separated from one another to define a gap within which the rotating system 48 and the rotor blades 20 coupled thereto can rotate relative to the static mast 30.

The electric motor 24 configured to drive rotation of the plurality of rotor blades 20 about the axis R is integrated into the stationary rotor hub assembly 34 and the rotating system 48. The electric motor 24 includes a stator assembly 70 rigidly coupled to the static mast 30, and a rotor assembly 72 configured to rotate about the axis R, best shown in FIG. 7.

The stator assembly 70 includes one or more electromagnetic coils 74 affixed to at least one surface of the rotor hub assembly 34. Wiring (not shown) associated with the at least one electromagnetic coil 74 may extend through a hollow interior of the static mast 30 and along a corresponding rotor hub 36, 38.

In the illustrated, non-limiting embodiment, electromagnetic coils 74 are affixed to both the first rotor hub 36 and the second rotor hub 38 to form a dual motor arrangement. However, embodiments where only one of the first and second rotor hubs 36, 38 includes electromagnetic coils 74 are also contemplated herein. The total number of electromagnetic coils 74 included in the motor 24 may vary based on the desired performance of the propulsion system 22. The electromagnetic coils 74 are spaced circumferentially about the static mast 30 and are generally located at a position spaced radially outward from the static mast 30, such as in vertical alignment with the over-running clutch 54 for example.

In embodiments of the propulsion system 22 having a dual motor arrangement, the electromagnetic coils 74 mounted to the first rotor hub 36 and the second rotor hub 38 portion may be substantially identical, or alternatively, may be different. In addition, the one or more of the electromagnetic coils 74 mounted to the first rotor hub 36 may be vertically aligned with one or more electromagnetic coils 74 mounted to the second rotor hub 38. Alternatively, the one or more electromagnetic coils 74 mounted to the first rotor hub 36 may be staggered or offset from the electromagnetic coils 74 mounted to the second rotor hub 38.

The rotor assembly 72 of the motor 24 includes one or more permanent magnets 76 mounted to the rotating system 48, and more specifically, to the over-running clutch 54. As shown, the magnets 76 are mounted to the over-running clutch 54 horizontally and are positioned such that the one or more magnets 76 are vertically aligned with the at least one electromagnetic coil 74 of the stator assembly 70. The spatial positioning between the electromagnetic coils 74 of the stator assembly 70 and the adjacent permanent magnets 76 of the rotor assembly 72 is defined by the clearance 42 between the upper and lower rotor hubs 36, 38 and the bearings 46, 56 positioned therein. In an embodiment, the magnets 76 are fixedly or removably mounted to at least one of an upper surface and a lower surface of the over-running clutch 54. The magnets 76 are generally circumferentially positioned about the over-running clutch 54, concentric with the static mast 30. The magnets 76 may, but need not be, equidistantly spaced about the over-running clutch 54.

The rotor assembly 72 is configured to rotate with respect to the stator assembly 70 and the static mast 30 as the magnets 76 of the rotor assembly 72 react with an induced magnetic field generated when the electromagnetic coils 74 of the stator assembly 70 are energized. As the over-running clutch 54 rotates about the axis R defined by the static mast 30, an energizing spring force pinches the rollers 58 between the features 60 of the rotor head 54 and the clutch 54. As a result of this engagement, torque is transferred from the clutch 54 to the rotor head 50. During operation, all electrical inputs necessary to power the motor 24 resides in the fixed frame of references, thereby eliminating the need for stationary to rotating power transfer couplings, such as slip rings. The motor electronic control unit (ECU), illustrated schematically at 78 in FIG. 9, is also located in the fixed frame and is operable to control application of electrical energy and signal to the stationary coils, thereby providing torque and speed control.

Figure 9:
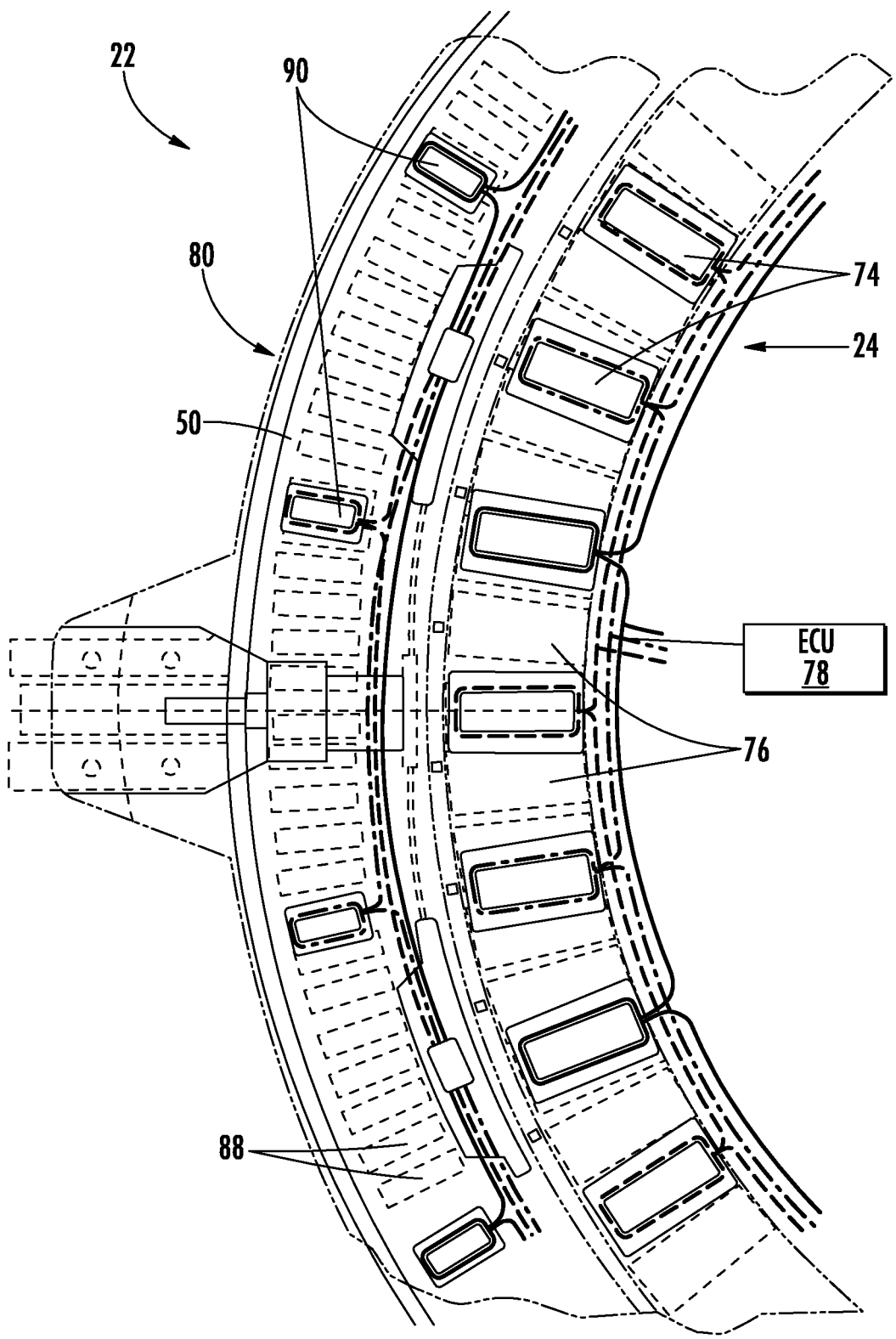
FIG. 9 is a top view of a portion of the propulsion system of FIG. 2 according to an embodiment.

With reference now to FIG. 9, in an embodiment, the propulsion system 22 additionally includes a power generation system 80. As shown, the power generation system 80 includes a generator stator 84 and a generator rotor 86. In the illustrated, non-limiting embodiment, the generator stator 84 is integrally formed with the rotor hub assembly 34 and includes one or more permanent magnets 88 affixed to at least one surface thereof. As shown, the plurality of permanent magnets 88 are located adjacent an outboard edge of at least one of the upper rotor hub 36 and the lower rotor hub 38. The generator rotor 86 is integrated into the rotor head 50 of the rotating system 48 and includes one or more electromagnetic coils 90 mounted to the rotating system 48. In the illustrated, non-limiting embodiment, the electromagnetic coils 90 are mounted to one or more surfaces of the rotor head 50 in generally vertical alignment with the permanent magnets 88.

As the electric motor 24 drives rotation of the rotating system 48 relative to the stationary rotor hub assembly 34, the permanent magnets 88 coupled to the rotor hub assembly 34 generate a magnetic field which induces an electrical current in the electromagnetic coils 90 mounted to the rotor head 50. This current induced in the electromagnetic coils 90 of the rotating system 48 may then be used to power one or more components located within the rotating frame of the propulsion system 22, such as an electromechanical actuator configured to control rotation of a corresponding rotor blade about a pitch axis. In such embodiments, the electrical power generation of the electromechanical actuator is self-contained within the rotor head 50, and a wireless system is used for lower power transfer and for communication with the electromechanical actuator. It should be understood that the propulsion system 22 illustrated and described herein is intended as an example only and that other suitable configurations are also within the scope of the disclosure.

Figure 11:
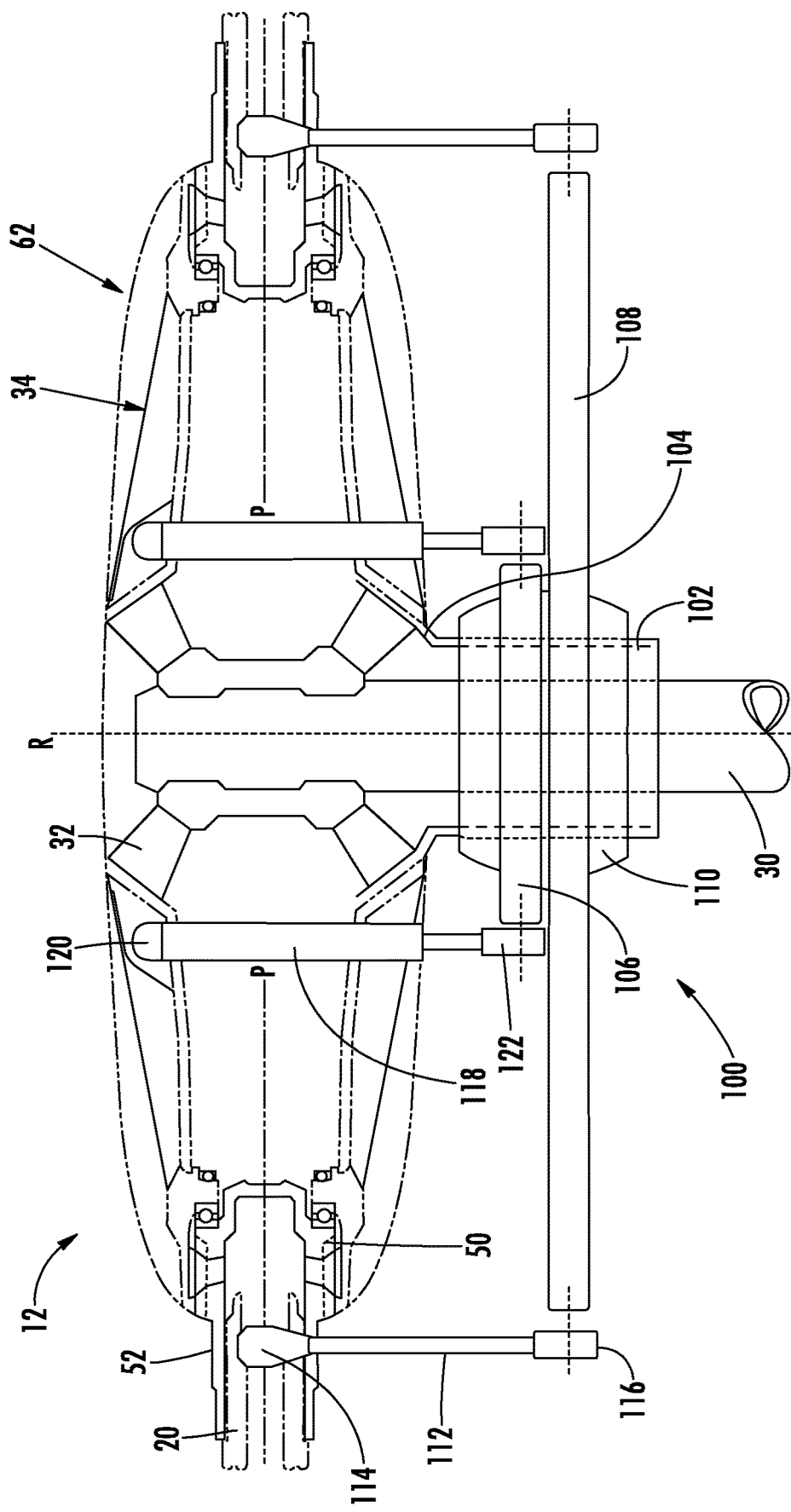
FIG. 11 is a cross-sectional view of a propulsion system including a swashplate assembly at least partially integrated therein according to an embodiment.
Figure 12:
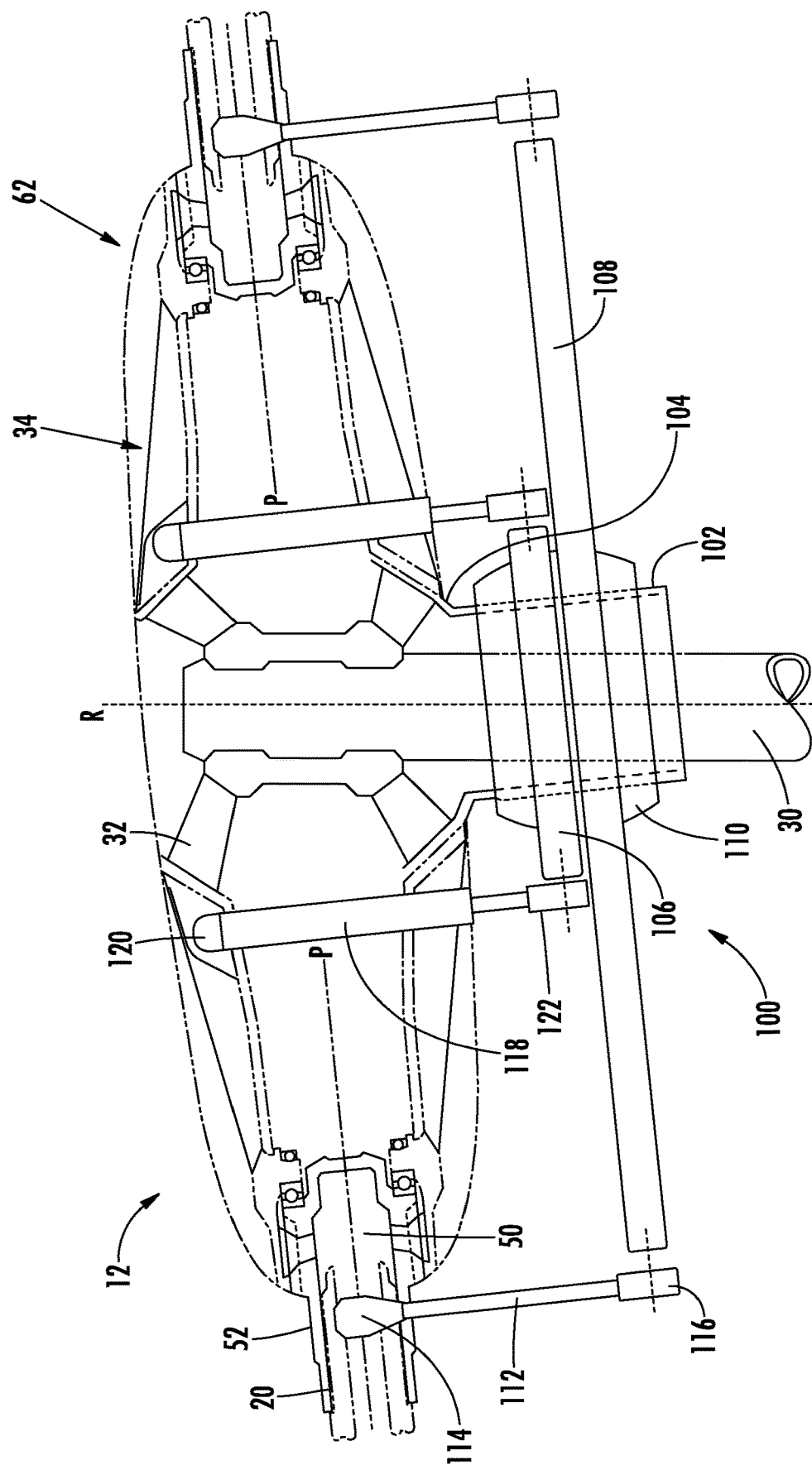
FIG. 12 is a cross-sectional view of the propulsion system including a swashplate assembly of FIG. 11, in a tilted configuration according to an embodiment.
Figure 13:
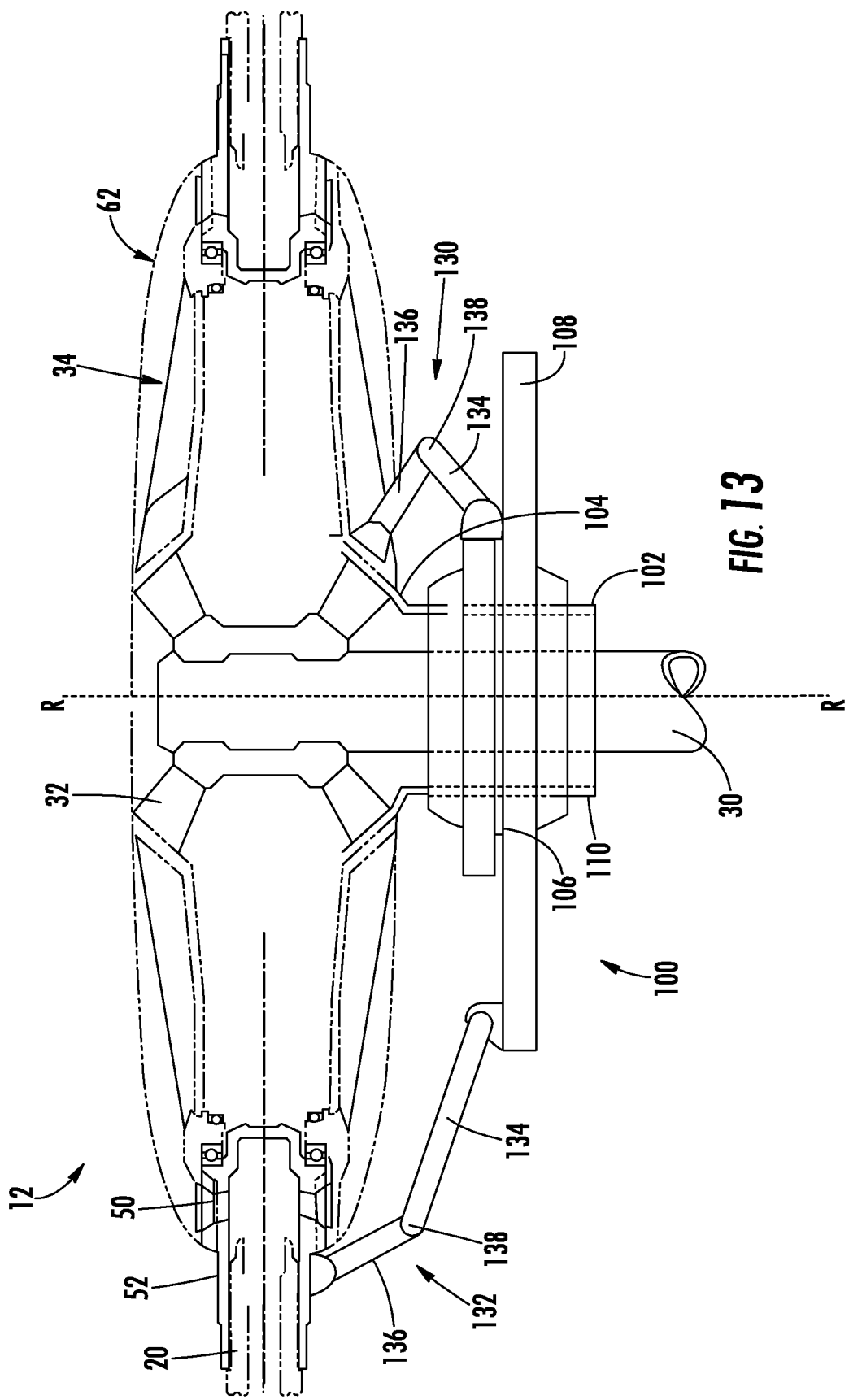
FIG. 13 is another cross-sectional view of the propulsion system including a swashplate assembly of FIG. 11 according to an embodiment.

With reference now to FIGS. 11-13, an example of a mechanical flight control system, such as a swashplate assembly 100 for example, adapted for use rotor assembly 12 having a propulsion system 22 embedded therein, is illustrated. As shown, the components of the swashplate assembly 100 are generally integrated with the propulsion system 22 to provide a consolidated rotor package having all the necessary flight dynamic components.

In the illustrated, non-limiting embodiment, the swashplate assembly 100 includes a swashplate guide 102 that is arranged concentrically with the rotor head 50 adjacent the rotor hub assembly 34. The swashplate guide 102 may be integrally formed with the rotor hub assembly 34, such as the lower rotor hub 38 for example, or alternatively, may be a component separate from the rotor hub assembly 34. In addition, the upper end 104 of the swashplate guide 102 may have a shape, such as a funnel-like shape for example, complementary to an adjacent portion of the elastomeric bearing 32.

The swashplate assembly 100 additionally includes a stationary swashplate 106 and a rotating swashplate 108 configured to rotate about the axis X relative to the stationary swashplate 106. The stationary swashplate 106 and the rotating swashplate 108 are stacked vertically relative to one another such that the stationary swashplate 106 is disposed between the rotor hub assembly 34 and the rotating swashplate 108. The rotating and stationary swashplates can also be in-plane with each other. Further, in an embodiment, the diameter of the stationary swashplate 106 is smaller than the diameter of the rotating swashplate 108. In an embodiment, the stationary swashplate 106 and the rotating swashplate 108 are mounted about the swashplate guide 102 via a uniball bearing 100. Together, the swashplate guide 102 and the uniball bearing 110 cooperate to allow the stationary and rotating swashplates 106, 108 to translate and pitch, in unison, relative to the static mast 30 (see FIG. 12). As shown, the stationary and rotating swashplates 106, 108 are configured to pitch and translate such that the swashplates 106, 108 maintain a constant alignment with the rotor hub assembly 34.

Each rotor blade assembly 20 associated with each blade cuff 52, is mounted to the rotor head 50 of the rotating system 48 so as to be rotatable about a pitch change axis P. It should be understood that various attachment systems and rotor blade pitch change systems are considered within the scope of the disclosure. In an embodiment, an electromechanical actuator, illustrated schematically at 92 (best shown in FIG. 10), may be mounted within the rotating system 48, such as within the rotor head 50 adjacent a blade cuff 52 for example.

Pitch change loads may be imparted to each rotor blade assembly 20 by a pitch control rod 112. As shown, each of the pitch control rods 112 is coupled at a first end 114 to a blade pitch horn assembly 20 and at a second end 116 to the rotating swashplate 108. In an embodiment, the pitch control rods 112 are mounted about an outer periphery of the rotating swashplate 108 in vertical alignment with a corresponding blade assembly 20. However, embodiments where the pitch control rods 112 are mounted to another surface of the rotating swashplate are also contemplated herein. The swashplate assembly 100 further includes at least one flight control actuator 118 connected at a first end 120 to a portion of the rotor hub assembly 34 and mounted at a second end 122 to the stationary swashplate 106. In the illustrated, non-limiting embodiment, the flight control actuators 118 are mounted about an outer periphery of the stationary swashplate 106. However, embodiments where the flight control actuators 118 are mounted to another surface of the stationary swashplate 106 are also contemplated herein. In an embodiment, the wiring (not shown) associated with the electromechanical actuators 92 and the flight control actuators 118 may extend through a hollow interior of the static mast 30 and along a corresponding rotor hub 36, 38.

Pitch control commands imparted by the flight control actuators 118 may cause the stationary and rotating swashplates 106, 108 to tilt about a central pivot point (not shown) defined by the uniball 110 along the axis of rotation R. This tilting of the swashplates 106, 108 applies a pitch change load to one or more of the blade assemblies 20 through the pitch control rods 112 coupled to the rotational swashplate 108. Articulation of the rotating swashplate 108 drives the pitch control rods 112 which cause one or more of the blade assemblies 20 to pitch about a respective pitch change axis P. Similarly, inputs from the flight control actuators 118 may cause the stationary and rotating swashplates 106, 108 to translate along the axis R to impart pitch control loads to the plurality of blade assemblies 20. When the swashplates 106, 108 translate along axis R, collective pitch change is imparted to the blade assemblies 20, and when the swashplates 106, 108 tilt about the central pivot point of the uniball 110, a cyclic pitch change is imparted to the blade assemblies 20.

As best shown in FIG. 13, a stationary scissors assembly 130 is mounted between the rotationally stationary swashplate 106 and a portion of the stationary rotor hub assembly 34, such as the lower rotor hub 38 for example. A rotating scissors assembly 132 extends from the rotational swashplate 108 to a portion of the rotor head 50, such as a blade cuff 52 for example. In the illustrated, non-limiting embodiment, each of the stationary scissors assembly 130 and the rotating scissors assembly 132 includes a first link 134 and a second link 136 connected by a scissor pivot 138. The scissors assemblies 130, 132 operate in a similar manner to those used in existing swashplate assemblies to maintain the azimuthal relationship between the stationary and rotating swashplates 106, 108 and the rotor assembly. Accordingly, the pivots 138 of each scissors assembly 130, 132 enables the corresponding swashplate 106, 108 to tilt as commanded by a control input.

Benefits of the present disclosure may include but are not limited to a reduction in weight, fewer parts and lower costs relative to more traditional aircrafts. Further, by integrating the swashplate assembly and actuators into the rotor hub assembly 34 and rotating system 48, the overall design is simplified by reducing the inter-system mechanical relationships typically required.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. An electric propulsion system comprising:
   a stationary rotor hub assembly;
   a rotating system mounted to the stationary rotor hub assembly, the rotating system being rotatable about an axis;
   an electric motor including a stator assembly associated with the stationary rotor hub assembly and a rotor assembly associated with the rotating system; and
   a swashplate assembly having a dynamic component integrated into the stationary rotor hub assembly.

2. The electric propulsion system of claim 1, wherein the dynamic component of the swashplate assembly is at least one flight control actuator.

3. The electric propulsion system of claim 1, further comprising a swashplate guide defining the axis and the swashplate assembly.

4. The electric propulsion system of claim 3, wherein the swashplate guide is integrally formed with the stationary rotor hub assembly.

5. The electric propulsion system of claim 3, wherein the swashplate assembly further comprises:
   a stationary swashplate rotationally fixed relative to the axis; and
   a rotating swashplate rotatable relative to the stationary swashplate about the axis.

6. The electric propulsion system of claim 5, wherein the stationary swashplate and the rotating swashplate are vertically stacked about the axis.

7. The electric propulsion system of claim 5, wherein a diameter of the stationary swashplate is less than a diameter of the rotating swashplate.

8. The electric propulsion system of claim 5, wherein the swashplate assembly further comprises a uniball configured to mount the stationary swashplate and the rotating swashplate about the swashplate guide.

9. The electric propulsion system of claim 8, wherein the stationary swashplate and the rotating swashplate maintain a constant alignment with the stationary rotor hub assembly.

10. The electric propulsion system of claim 8, wherein the swashplate assembly further comprises a flight control actuator connected at a first end to the stationary rotor hub assembly and connected at a second end to the stationary swashplate, the flight control actuator being positioned within the stationary rotor hub assembly.

11. The electric propulsion system of claim 10, wherein the swashplate assembly further comprises a pitch control rod connected at a first end to a rotor blade assembly and connected at a second end to the rotating swashplate.

12. The electric propulsion system of claim 10, wherein the swashplate assembly further comprises:
   a stationary scissors assembly extending between the stationary swashplate and the stationary rotor hub assembly; and
   a rotating scissors assembly extending between the rotating swashplate and the rotating system.

13. The electric propulsion system of claim 8, wherein the flight control actuator is operable to translate the stationary swashplate and the rotating swashplate along the axis to impart collective pitch control.

14. The electric propulsion system of claim 8, wherein flight control actuator is operable to tilt the stationary swashplate and the rotating swashplate along the axis to impart cyclic pitch control.

15. The electric propulsion system of claim 8, wherein power for operating the flight control actuator is provided via wiring extending through at least one of a static mast and the stationary rotor hub assembly.

16. A rotary wing aircraft comprising:
   an airframe;
   a rotor system including:
      a static mast engaged with the airframe and extending along an axis;
      a stationary rotor hub assembly;
      a rotating system coupled to the stationary rotor hub assembly, the rotating system being rotatable about the axis;
      an electric motor housed within the rotor system, the electric motor including a stator assembly coupled to the stationary rotor hub assembly and a rotor assembly coupled to the rotating system;
      a plurality of rotor blades projecting radially outward from the rotor system; and
      a swashplate assembly at least partially integrated into the stationary rotor hub assembly.

17. The rotary wing aircraft of claim 16, wherein the rotor system further comprises a power generation system operable to generate power as the rotating system rotates about the axis.

18. The rotary wing aircraft of claim 16, wherein the swashplate assembly further comprises a flight control actuator, the flight control actuator being positioned within the stationary rotor hub assembly.

19. The rotary wing aircraft of claim 16, wherein the swashplate assembly further comprises a swashplate guide mounted concentrically with the rotating system.

20. The rotary wing aircraft of claim 19, wherein the swashplate guide is integrally formed with the stationary rotor hub assembly.

* * * * *